US009485564B2

(12) United States Patent
Mathieu et al.

(10) Patent No.: US 9,485,564 B2
(45) Date of Patent: Nov. 1, 2016

(54) SYSTEM OF SOUND REPRODUCTION WITH AUDIO HEADSETS PROVIDED WITH SOUND PROCESSORS, COMPONENTS OF SUCH A SYSTEM AND ASSOCIATED METHOD

(71) Applicant: PARROT, Paris (FR)

(72) Inventors: Jerome Mathieu, Paris (FR); Frederic L'Huilery, Paris (FR)

(73) Assignee: PARROT, Paris (FR)

( * ) Notice: Subject to any disclaimer, the term of this patent is extended or adjusted under 35 U.S.C. 154(b) by 0 days.

(21) Appl. No.: 14/858,977

(22) Filed: Sep. 18, 2015

(65) Prior Publication Data
US 2016/0094908 A1 Mar. 31, 2016

(30) Foreign Application Priority Data
Sep. 29, 2014 (FR) ...................................... 14 59185

(51) Int. Cl.
| H04R 1/10 | (2006.01) |
| G10K 15/02 | (2006.01) |
| G06F 3/16 | (2006.01) |
| H04R 27/00 | (2006.01) |
| H04S 7/00 | (2006.01) |

(52) U.S. Cl.
CPC ............ *H04R 1/1041* (2013.01); *G06F 3/165* (2013.01); *G10K 15/02* (2013.01); *H04R 27/00* (2013.01); *H04R 2420/07* (2013.01); *H04R 2499/11* (2013.01); *H04S 7/30* (2013.01)

(58) Field of Classification Search
CPC H04R 1/1041; H04R 27/00; H04R 2420/07; H04R 2499/11; G06F 3/165; G10K 15/02
See application file for complete search history.

(56) References Cited

U.S. PATENT DOCUMENTS

| 2004/0125703 A1* | 7/2004 | Ibuka ..................... H04B 1/20 369/2 |
| 2004/0151336 A1* | 8/2004 | Han ........................ H04R 5/04 381/370 |
| 2007/0142942 A1* | 6/2007 | Hyatt .................. H04M 1/6058 700/94 |
| 2008/0125044 A1 | 5/2008 | Kim |
| 2009/0271015 A1* | 10/2009 | Oh ........................ G10L 19/008 700/94 |
| 2010/0008217 A1* | 1/2010 | Ding .................... H04J 11/0023 370/210 |
| 2010/0099943 A1* | 4/2010 | Davis ..................... A61H 23/06 600/28 |
| 2010/0321379 A1* | 12/2010 | Kang ................. H04N 7/17318 345/419 |
| 2011/0264769 A1* | 10/2011 | Yoneda ............. G06F 17/30017 709/219 |

(Continued)

FOREIGN PATENT DOCUMENTS

WO 2009093867 A2 7/2009

*Primary Examiner* — Simon Sing
(74) *Attorney, Agent, or Firm* — Haverstock & Owens LLP

(57) ABSTRACT

The system comprises audio headsets able to apply audio processing operations in response to presets that are common to all the headsets, smart terminals provided with audio flow generation means, and communication means to transmit to the headsets an audio flow and presets to be applied to this flow. A preset server memorises the presets associated with works. Certain terminals can generate presets and transmit them to the server, whereas other terminals collect these presets to apply them to the corresponding works at the time of reproducing these latter.

9 Claims, 2 Drawing Sheets

(56) References Cited

U.S. PATENT DOCUMENTS

| | | | |
|---|---|---|---|
| 2012/0014553 A1* | 1/2012 | Bonanno | H03G 3/341 381/364 |
| 2012/0197650 A1 | 8/2012 | Resch et al. | |
| 2013/0279719 A1* | 10/2013 | Lee | G06F 3/165 381/107 |
| 2014/0073429 A1 | 3/2014 | Meneses et al. | |
| 2014/0136637 A1* | 5/2014 | Chen | H04L 51/20 709/206 |
| 2014/0248036 A1* | 9/2014 | Saari | H04N 9/8205 386/248 |
| 2014/0294183 A1* | 10/2014 | Lee | H04R 3/005 381/56 |
| 2015/0071448 A1* | 3/2015 | Mesfin | H04R 25/552 381/23.1 |

* cited by examiner

SYSTEM OF SOUND REPRODUCTION WITH AUDIO HEADSETS PROVIDED WITH SOUND PROCESSORS, COMPONENTS OF SUCH A SYSTEM AND ASSOCIATED METHOD

FIELD OF THE INVENTION

The present invention generally relates to the audio head sets, and more particularly the customization of the sound reproduction with such headsets.

BACKGROUND OF THE INVENTION

Such headsets include a rechargeable battery and a wireless receiving circuit, for example radio (typically according to the Bluetooth specifications—registered trademark of Bluetooth SIG) or infrared, adapted to receive the audio signals conveyed by such a channel, in order to decode and transform them into analog sound signals applied to the transducers. The most recent audio headsets also contain audio processing electronic circuits intended to perform an equalization, to apply sound effects, to dynamically control the volume of reproduction, to neutralize the ambient noises, etc.

Generally, the equalization and sound effect presets are applied at the user's choice, through a control by means of an interface located on a remote device, such as a smartphone, communicating with the audio head-set, typically through a wireless link according to the Bluetooth communication protocol. The headset marketed by the applicant company under the commercial name Zik (registered trademark) has such a functionality. In a similar domain, the US 2014/0073429 A1 describes a headset inter-faced through a wireless link with a videogame console, and provided with a signal processor integrating several presets kept in memory. These pre-sets may possibly be presets downloaded from a remote site via the game console. They can be selected at the user's will by means of a select button and a menu shown on a screen integrated to an earphone of the headset.

SUMMARY OF THE INVENTION

The present invention aims to enrich the possibilities of creation, sharing and use of sound presets of an audio headset provided with switchable equalization presets.

In particular, the invention aims to allow that a given artist or referent can suggest or impose that a given work, typically the work of the artist (song-writer, composer, performer, arranger, etc.), is listened to by the public in conditions of reproduction as desired by the artist.

The invention also aims to allow the reproduction of the work faithfully to the artist's spirit, or to select reproduction presets chosen among a group of presets suggested by one or several artists or other referents in the field.

The invention hence proposes, according to a first aspect, a system of sound reproduction by means of audio headsets, comprising, in a manner known per se, as disclosed by the above-mentioned US 2014/0073429 A1:
  a set of audio headsets adapted to perform a sound reproduction by applying processing operations, by means of a sound processor, in response to reproduction presets that are common to all the headsets;
  a set of smart terminals provided with means for generating an audio flow;
  communication means between the smart terminals and the associated audio headsets, adapted to transmit to these latter, from the smart terminals, an audio flow as well as reproduction presets to be applied to said flow;
  a preset server, adapted to memorize reproduction presets respectively associated with works;
  network communication means between said server and said smart terminals; and
  means provided in at least certain smart terminals to collect from the server reproduction presets associated with works for which they are liable to emit audio flows, and to transmit them to the associated audio headset for the reproduction thereof.

Characteristically of the invention:
  the communication means are also adapted to transmit to the audio headsets, from the smart terminals, characteristic markers associated with the audio flow;
  it is provided in at least certain smart terminals means for generating reproduction presets associated with works in response to actions via a user interface, and for transmitting them to the server; and
  it is provided in each audio headset a memory containing a reproduction preset database, and means (450) for forming a database interrogation request from said characteristic markers received from a smart terminal (500) in association with an audio flow so as to find the corresponding reproduction presets.

Advantageously, the characteristic markers are markers of identification of at least one among a track, an album, an artist, a style.

The invention proposes, according to a second aspect, a set formed of an audio headset and a smart terminal, the smart terminal being adapted to transmit an audio flow to the audio headset through a link. The audio headset comprises a processor adapted to apply a sound processing to the audio flow to be reproduced in response to a characteristic marker associated with the audio flow, a memory adapted to store presets, and means (450) for reading in the memory and applying to said processor a preset chosen as a function of the characteristic marker received.

Characteristically of the invention, the smart terminal is also adapted to transmit to the audio headset characteristic markers associated with said audio flow, and the audio headset comprises means for reading in the memory and applying to the processor a preset chosen in the memory as a function of the characteristic marker received from the smart terminal.

In a preferred but optional implementation, said characteristic markers are metadata associated with an audio file adapted to be played in the smart terminal.

It is moreover advantageous that the smart terminal comprises means for updating the reproduction presets memorized in the audio headset, from recent reproduction presets received via a network from a preset server.

The invention also aims at an audio headset, comprising means for receiving an audio flow from a source, a memory adapted to store reproduction presets, and a processor adapted to apply a sound processing to the audio flow to be reproduced in response to a preset.

Characteristically of the invention, this headset further comprises means for receiving in association with the audio flow a marker characteristic of said flow, and means for reading in the memory and applying to said processor a preset chosen as a function of the characteristic marker received.

According to an advantageous but optional additional characteristic, the headset further comprises means for updating said presets, from a smart terminal.

Another aspect of the invention consists in a smart terminal, comprising an audio player adapted to generate an audio flow, connection means, for applying thereto the audio flow, with a sound reproduction device liable to store reproduction presets, and network communication means.

Characteristically of the invention, this smart terminal further comprises means for creating and/or selecting a reproduction preset during the generation of an audio flow, and means for transmitting to a server the created and/or selected preset, in association with a characteristic marker of the audio flow for which said reproduction preset has been created and/or selected.

Finally, the invention proposes a method of reproduction of an audio flow by an audio headset, characterized in that it comprises the following steps:
a) receiving, by the audio headset, of a marker characteristic of an audio flow to be reproduced;
b) collection, in a memory of the audio headset, from said characteristic marker, of a preset associated with said audio flow;
c) application of the preset to an audio processing device; and
d) reproduction of the audio flow processed by the audio processing device as a function of the preset applied.

BRIEF DESCRIPTION OF THE DRAWINGS

A preferred embodiment of the invention will now be described, by way of non-limitative example and with reference to the appended drawings, in which the same reference denote identical or functionally similar elements throughout the figures.

DETAILED DESCRIPTION OF THE INVENTION

Figure 1:
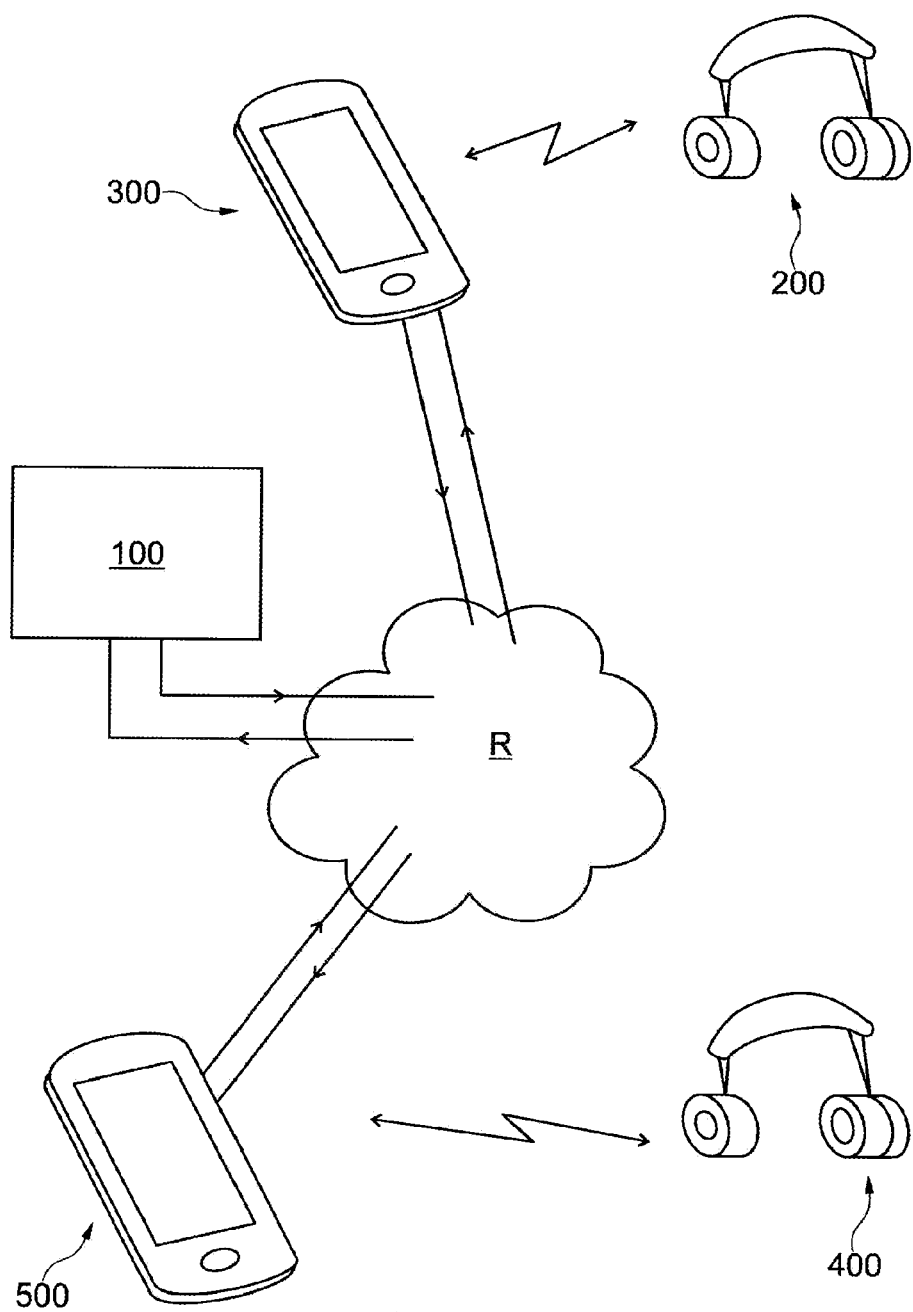
FIG. 1 schematically shows the different components of a system liable to implement methods of the present invention.

With reference to the drawings, it has been shown a system that comprises an audio preset sharing server 100, an artist audio headset 200, an artist smart terminal or smartphone 300, a user audio headset 400 and a user smart terminal or smartphone 500.

As will be described hereinafter, the smart terminal 300 communicates with the artist headset 200 through a wireless link, for example according to the Bluetooth protocol. Likewise, the smart terminal 500 communicates with the user headset 300 through a wireless link according to the same type of protocol.

The terminals 300 and 500 are moreover provided with a functionality of communication through a network R such as the Internet, to establish communication sessions with the server 100, for example according to the TCP/IP protocol.

First, the functionalities of the system of FIG. 1 will be generally described.

By means of the headset 200 and the smartphone 300, an artist or another referent listens to a work by choosing different audio reproduction presets implemented by a specialized processor 210 integrated in the headset.

The "reproduction presets" can comprise, with no limitation, equalization presets (bass, medium, treble, etc.), and sound effect presets (spatialization, reverberation, delays, compression, accentuation, etc.), these different effects being known per se.

This creation of presets is performed by means of a user interface, preferably with a touch screen where virtual cursors, rotary knobs, etc., are actuated by the user to obtain the desired presets.

As a variant, rather than creating himself the presets, the artist may apply successively pre-existing presets memorized in his smart terminal or in his audio headset (after having possibly downloaded them from the server 100), and choose the preset that he finds the most appropriate.

Another variant may be a mixed approach, where basic presets are proposed to the artist, and the latter retouches them.

After having listened to the work or parts of the latter with different reproduction presets (either among pre-selections, or with presets performed by himself by acting of the reproduction parameters), the artist uses the user interface of his terminal 300 so that the presets obtained (by creation or selection) are transmitted to the server in association with data characteristic of the work, preferentially all or part of the metadata of the work, for being made available by the users.

It will be noted herein that a given preset created or chosen by an artist may be applied to a single work or track, or to a set of works (for example, the tracks of an album or of the works of the artist), or to a musical style to which the work belongs, etc.

Moreover, the system of the invention allows an artist or referent to allocate presets to works of other artists.

The presets created and memorized in the server, as described herein-above, may then be downloaded towards user smart terminals such as the terminal 500, and transferred as will be seen in detail hereinafter in the following towards a preset memory provided in the associated audio head-set 400.

At the time of selection of an audio file by a user for the playing thereof by the smart terminal 500, this user can:
  either (in a manner known per se) select manually a preset from a list of suggested presets displayed on the screen of the terminal,
  or (characteristically of the invention), in the case where he has chosen an automatic allocation, let the system (in this case the audio headset 400 as will be described in more detail hereinafter) select the preset that has been allocated to the file by an artist.

This mode of automatic selection, according to the invention, of a preset may typically be implemented during the listening of the music via a Blue-tooth link between the terminal 500 and the audio headset 400, by exploiting herein the Advanced Audio Distribution Bluetooth Profile (A2DP). For that purpose, the system uses the Audio-Video Remote Control Profile (AVRCP) to collect and communicate to the audio headset 400 the "tag" information or markers (metadata) relating to the track whose reproduction is in progress (title, artist, album, style, etc.) allowing to perform the selection of an associated preset.

As a variant, other means for collecting and transmitting such metadata, for example via an integrated purchase function such as the In-App Purchase function proposed by Apple Inc., may be used.

Figure 2:
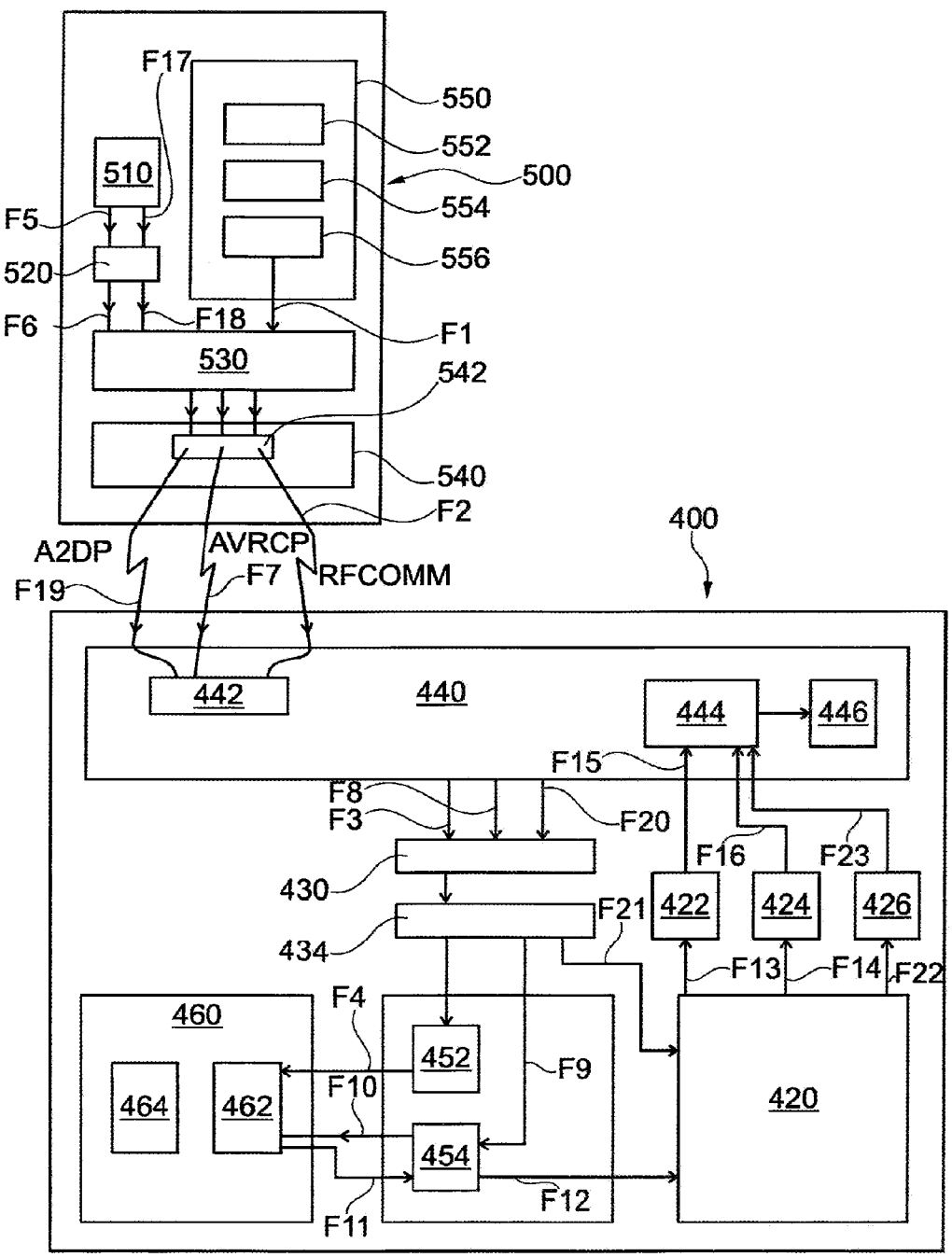
FIG. 2 is a block-diagram illustrating the different functionalities implemented by a smartphone and an audio headset of a user in accordance with the teachings of the invention.

With reference now to FIG. 2, an electronic architecture on the smart terminal side and on the audio headset side allowing the implementation of the present invention will now be described.

The smart terminal is the user terminal 500 of FIG. 1. It comprises in a manner known per se a player 510 for playing audio files, for example in MP3, AAC, WMA format, etc., which cooperate with a pile of media 520 of the terminal.

A Bluetooth pile 530 is in communication with the pile of media 520 and exchanges data with a Bluetooth component or chip 542 provided on the electronic card 540 of the terminal.

An audio preset management program 550 run by the processor of the terminal comprises a user interface 552, a communication protocol 554 and an Application Programming Interface (API) 556 in communication with the Bluetooth pile 530.

The audio headset 400 comprises for its part a hardware part 440 provided, in particular, with a Bluetooth chip or component 442, a digital signal processor or DSP 444 intended to process the audio flow to be reproduced (including the digital/analog conversion and the amplification), and transducers 446.

The processor 444 is piloted from an audio core or kernel 420 through an equalization core or kernel 422, a spatialization core or kernel 424 and a player management core or kernel 426.

An audio preset core or kernel 450 communicates with a communication protocol 434 with a Bluetooth pile 430 exchanging data with the Bluetooth chip 442.

This core 450 cooperates with a database 460, for example in the SQLite (registered trademark) format, containing a data processing core 462 and preset files 464.

The core 450 comprises a sub-program 452 for inserting presets in the database 460, and a sub-program 454 for collecting presets from the database.

The Bluetooth chips 542, 442 of the smart terminal and of the audio head-set communicate with each other through an Advanced Audio Distribution Bluetooth Profile (A2DP), an Audio-Video Remote Control Bluetooth Profile (AVRCP), in its release 1.3 or subsequent, and finally by the RFCOMM (Radio Frequency COMMunication) service.

The cooperation between the smart terminal 400 and the headset 500 for the transmission of a sound reproduction preset to the headset 500 comprises the following aspects:
- a user implements the user interface 552 of the audio preset management program 550 to create an audio preset or to download it from the preset server 100, and to memorize it in the smart terminal;
- the program 550 can then send the preset towards the Bluetooth pile 530 of the smart terminal (arrow F1);
- this preset is then transmitted to the audio headset 400 using preferably a bespoke protocol on the RFCOMM Bluetooth transport service (arrows F2 and F3);
- the preset received by the preset core 450 is loaded by means of the sub-program 452 in the database 460 (arrow F4).

During the playing of an audio track or file:
- the media player 510 of the smart terminal sends the metadata or "tag" markers of the track it is ready to play to the pile of media 520 of said terminal (arrow F5);
- the smart terminal 500 sends that metadata to the audio headset 400 via the AVRCP profile (arrows F6, F7, F8 and F9);
- the preset core 450 searches in the database 460 for a preset corresponding to the metadata received (request F10).

It is reminded herein that the preset search criterion may be an identifier for a track, an album, an artist, a style, etc. (at the choice of the artist or referent who has created the preset), all that information being contained in the metadata associated with the audio file to be played;
- if the database 460 finds a preset, the preset core 450 transmits the latter to the audio core 420 (arrows F11 and F12).

If no preset is found, default presets are used;
- the audio core 420 applies this preset so that it is allocated to the sound flow by the processor 444, via the cores 422 and 424 (arrows F13, F14, F15, F16);
- finally, the audio flow is emitted by the player 510 and transmitted via the A2DP Bluetooth profile to the audio headset 400 (arrows F17 to F23), to reach the processor 440, where the effects according to the reproduction preset selected as hereinabove are applied to the flow, and the latter is reproduced.

It is understood that this architecture allows to select presets allocated to sound tracks, via the metadata or "tag" markers by means of the database 460.

It will be observed herein that the memorization of the presets inside the audio headset 400 allows to ensure an optimum reactivity in case of pre-set change at the time of the transition between the playing of a work and the playing of the following work, no transmission of presets being necessary between the smart terminal and the headset (because this is the latter that memorizes the presets and ensures automatically their "smart" selection), only the metadata or "tag" markers of the audio file being transmitted.

The invention can however be implemented with a dynamic transmission of presets before the playing of a work via the RFCOMM service. It may also be provided, as a variant, to encapsulate the presets in the metadata of an audio file.

The creation of presets at an artist terminal 300 is performed with a preset management program that can be identical to that of the user terminal, or consists in a dedicated program. Hence, an artist can create specific pre-sets in association with given data, and the program 550 comprises means for sending these presets, in association with the metadata of the works for which these presets have been chosen, to the preset server 100.

The presets hence proposed by the artists can be recovered by the users either at a later time, or dynamically, previously to the playing of a work.

In the first case, the user smart terminal 500 opens a session via the Internet with the preset server 100, and scans the metadata of the auto files memorized in the terminal 500 to download the new data of the pre-sets made available by artists from the last session, and—in the implementation with an integrated preset database described hereinabove—to transmit these new presets to the database 460.

In the second case, the terminal 500 checks the preset server 100 before each playing, to download the preset corresponding to the metadata of the work chosen for the playing (in case of problem of communication, a default preset is applied).

As a variant, the server is able to send notifications to the users of smart terminals implementing, in a "push" way, the system of the invention in order to signal them the existence of new presets available for audio files that are stored in their terminal.

According to still another variant, the preset updating process may be automated.

The present invention finds an application as soon as a community is equipped with identical or similar audio headsets, in that they are able to respond to common presets to reproduce the sound in the same manner. The reproduction chain is hence fully controlled.

Of course, the present invention is not limited to the embodiment and the variants described hereinabove, but the one skilled in the art will be able to make many adaptations thanks to his general knowledges. In particular:

the one skilled in the art will be able to adapt the invention to the sound reproduction, not from auto files memorized in the terminal 500 and played on demand, but in streaming, i.e. as a flow from a server of audio content played in the server itself;

in the case where several artists or referents have proposed different presets for a same work (or a same album, etc.), the user interface, or a suitable advanced selection program, will allow to select the preset to be used.

The invention claimed is:

1. A system of sound reproduction by means of audio headsets, comprising:

a set of audio headsets adapted to perform a sound reproduction by applying processing operations, by means of a sound processor, in response to reproduction presets that are common to all the headsets;

a set of smart terminals provided with means for generating an audio flow;

communication means between the smart terminals and the associated audio headsets, adapted to transmit to said audio headsets, from the smart terminals, said audio flow as well as said reproduction presets to be applied to said audio flow;

a presets server, adapted to memorize reproduction presets respectively associated with works; and network communication means between said server and said smart terminals;

at least certain smart terminals being user terminals comprising means adapted to collect from the server reproduction presets associated with works conveyed in audio flows, and to transmit said reproduction presets to the associated audio headset for the reproduction of said audio flows, wherein:

said communication means between the smart terminals and the associated audio headsets are also adapted to transmit to the audio headsets, from the smart terminals, characteristic markers associated with the audio flow;

at least certain smart terminals being referent terminals comprising: means for generating reproduction presets associated with works in response to actions via a user interface; means for creating and/or selecting reproduction presets during the generation of an audio flow; and means for transmitting to said server the created and/or selected reproduction presets, in association with a marker characteristic of the audio flow for which a corresponding reproduction preset has been created and/or selected; and it is provided in each audio headset a memory containing a reproduction preset database, and means for forming a database interrogation request from said characteristic markers received from a smart terminal in association with an audio flow so as to find the corresponding reproduction preset.

2. The system of claim 1, wherein the characteristic markers are markers of identification of at least one among a track, an album, an artist, a style.

3. The system of claim 1, wherein each of said audio headset comprises:

a processor adapted to apply a sound processing to the audio flow to be reproduced in response to a characteristic marker associated with the audio flow;

a memory adapted to store presets; and means for reading in the memory and applying to said processor a preset chosen in said memory as a function of the characteristic marker received from the smart terminal associated to the audio headset, and wherein:

said smart terminal associated to the audio headset is also adapted to transmit to the audio headset characteristic markers associated with said audio flow.

4. The system of claim 3, wherein said characteristic markers are metadata associated with an audio file adapted to be played in the smart terminal.

5. The system of claim 3, wherein the smart terminal comprises means for updating the reproduction presets memorized in the audio headset, from recent reproduction presets received via said network from said preset server.

6. The system of claim 1, wherein each of said audio headset comprises:

means for receiving an audio flow from a source;

a memory adapted to store reproduction presets;

a processor adapted to apply a sound processing to the audio flow to be reproduced in response to a preset, means for receiving in association with the audio flow a marker characteristic of said flow; and means for reading in the memory and applying to said processor a preset chosen as a function of the characteristic marker received.

7. The system of claim 6, wherein said characteristic markers are metadata associated with an audio file adapted to be played by a smart terminal.

8. The system of claim 6, further comprising means for updating said presets, from a smart terminal.

9. The system of claim 1, wherein each of said referent terminal further comprises:

a) an audio player adapted to generate said audio flow;

b) connection means, for applying said audio flow to a sound reproduction device, said reproduction device being further adapted to store said reproduction presets, and c) network communication means.

* * * * *